(12) United States Patent
Schäfer (10) Patent No.: US 10,628,689 B2
(45) Date of Patent: Apr. 21, 2020

(54) METHOD AND DEVICE FOR IDENTIFYING THE SIGNALING STATE OF AT LEAST ONE SIGNALING DEVICE

(71) Applicant: SMR Patents S.à.r.l., Luxembourg (LU)

(72) Inventor: Henrik Schäfer, Stuttgart (DE)

(73) Assignee: SMR Patents S.à.r.l, Luxembourg (LU)

( * ) Notice: Subject to any disclaimer, the term of this patent is extended or adjusted under 35 U.S.C. 154(b) by 0 days.

(21) Appl. No.: 15/893,217

(22) Filed: Feb. 9, 2018

(65) Prior Publication Data
US 2018/0232586 A1  Aug. 16, 2018

(30) Foreign Application Priority Data
Feb. 9, 2017 (DE) .......... 10 2017 102 593

(51) Int. Cl.
*G06K 9/00* (2006.01)
*G06F 3/0488* (2013.01)
(Continued)

(52) U.S. Cl.
CPC ......... *G06K 9/00825* (2013.01); *B60W 50/16* (2013.01); *G06F 3/0481* (2013.01);
(Continued)

(58) Field of Classification Search
CPC ............. B60W 50/16; B60W 2050/146; G06F 3/0481; G06F 3/0488; G06K 9/00791; G06K 9/00825; G06K 9/00597; G06K 9/3233; G06K 9/4652; G06N 20/10; G06N 3/08; G06N 3/0454; G06N 5/046; G06T 7/11; G06T 7/90; G06T 2207/20084;
(Continued)

(56) References Cited

U.S. PATENT DOCUMENTS

2012/0224060 A1* 9/2012 Gurevich .................. B60R 1/00
                                                    348/148
2012/0288138 A1* 11/2012 Zeng .................. G08G 1/09623
                                                    382/103
(Continued)

FOREIGN PATENT DOCUMENTS

DE     102011087459 A1    6/2013
DE     112012006761 T5    4/2015
(Continued)

*Primary Examiner* — Brian Wilson
(74) *Attorney, Agent, or Firm* — Jones Day (57) ABSTRACT

A method for identifying a signaling state of at least one signaling device from a plurality of signaling devices includes obtaining at least one image which comprises each of the plurality of signaling devices, representing at least one first group of the plurality of signaling devices detected by the image using a display device, receiving a user input regarding the display device or regarding a representation provided by the display device, evaluating the user input and selecting a second group from the first group of the plurality of signaling devices, and detecting a signaling state of the signaling devices of the second group and outputting a signal as a function of at least one detected signaling state of a signaling device of the second group in response to a change in the signaling state. A device for carrying out such a method is also described.

9 Claims, 5 Drawing Sheets

(51) Int. Cl.
*B60W 50/16* (2020.01)
*G06F 3/0481* (2013.01)
*B60W 50/14* (2020.01)

(52) U.S. Cl.
CPC ..... *G06F 3/0488* (2013.01); *B60W 2050/146* (2013.01); *G06K 9/00597* (2013.01)

(58) Field of Classification Search
CPC ........... G06T 2207/30252; G06T 2207/20164; G08G 1/09623
See application file for complete search history.

(56) References Cited

U.S. PATENT DOCUMENTS

2013/0211682 A1* 8/2013 Joshi .................... G08G 1/0967
701/70
2015/0187214 A1* 7/2015 Ichikawa ........... G06K 9/00825
348/118

FOREIGN PATENT DOCUMENTS

DE 102015003847 A1 * 8/2015 ......... G08G 1/09623
DE 10-2015005222 A1 * 12/2015 ....... G08G 1/096783
DE 102015005222 A1 12/2015

* cited by examiner

METHOD AND DEVICE FOR IDENTIFYING THE SIGNALING STATE OF AT LEAST ONE SIGNALING DEVICE

CROSS-REFERENCE TO RELATED APPLICATIONS

This application claims the benefit of foreign priority to German Patent Application No. DE 10 2017 102 593.6, filed Feb. 9, 2017, which is incorporated by reference herein in its entirety for all purposes.

BACKGROUND

1. Field of the Invention

The following description relates to a method for identifying the signaling state of at least one signaling device. For example, the signaling devices may include traffic lights, and a plurality of such signaling devices may be present. The following description also relates to a motor vehicle in which the method is carried out, as well as a mobile radio device used with the method.

2. Related Art

A number of systems are known in the field of driver assistance and the autonomous driving of motor vehicles. Systems are known from DE 10 2010 063 006 A1, DE 10 2011 105 520 A1 and DE 10 2012 023 867 A1, in which traffic lights are detected and the signaling state thereof is identified and evaluated with the aid of a front camera in a vehicle. In the process, the environment outside the traffic lights can be considered in order to control the vehicle in a suitable manner. Cameras are also employed in motor vehicles in accordance with US 2013/0211682 A1 and US 2014/0222280 A1, in order to define a state. Such a state can, as for instance described by WO 2009/000580 A1, refer to starting a motor vehicle following a prior stop. As described by WO 2009/000580 A1, an image of the observed traffic lights is displayed to the driver, and the driver receives a signal when the traffic lights changes to green.

DE 10 2011 087 459 A1 describes a driver assistance system having a detecting means, such as a camera, for detecting an environment of the vehicle as well as a user interface which can be used by the driver. The driver can specify objects by means of this user interface. These objects can be, for example, traffic lights, road signs, lane markings, other vehicles or a parking space. One or more functions are executed for this object as a function of the type of object specified.

DE 11 2012 006 761 T5 describes a driver assistance device which does not output any unnecessary alerts for the driver. The driver assistance device includes a display which displays an image of the environment of a vehicle, a setting unit which sets a target selected by the driver as a target for recognition, a detection unit which detects a change in state of the target for recognition in the image, and an alert control unit which alerts the driver of the detection result. The fact that no alerts are output if a target for recognition has not been selected by the driver means that no unnecessary alerts are output.

DE 10 2015 005 222 A1 describes a method for establishing traffic lights which are of relevance to a vehicle. In this case, an image of the environment is detected by means of a camera, which image includes the traffic lights and which is displayed on a display. A set of traffic lights which is relevant to the vehicle is established as a function of the detected viewing direction of the driver of the image displayed on the screen.

DE 10 2015 003 847 A1 describes a method for detecting light signals of traffic lights, and for signaling these light signals to the driver of a vehicle. In this case, the environment is detected by means of a camera and the detected image data are evaluated for the presence of red light signals. Red traffic light signals are displayed on a display and the driver can confirm by means of a control action whether a displayed red-light signal originates from a relevant set of traffic lights or which displayed red light signal originates from a relevant set of traffic light.

SUMMARY

Previous driver assistance systems are less reliable if there is a plurality of traffic lights in the field of view of the camera. Lane detection in the form of that described, for example, in DE 10 2011 105 520 A1 only helps to a limited extent. In at least one example, a way in which a driver can be supported more extensively is provided.

In an aspect, a method includes obtaining an image so that each of the plurality of signaling devices is detected by one image. Then, at least one first group of the signaling devices detected from an image is shown by means of a display device. The first group may include all of the plurality of signaling devices, however a selection of the signaling devices can already be obtained by an evaluation system (a suitable data processing device), in order to form the first group. The first group typically includes at least two signaling devices. A user input given regarding the display device or regarding the representation provided by the display device is then received. The user input can therefore refer to the display device itself, i.e. to the displayed image, but it can also refer to the contents of the representation. That is, it may refer to additional information which taking the form of alphanumerical characters for instance is part of the representation. The user input is then effected on an alphanumerical keyboard or the like. The user input is subsequently evaluated, and a second group is selected from the first group made up of the plurality of the signaling devices.

In the case of at least the plurality of possible user inputs, the second group may be smaller than the first group. The signaling state of the signaling devices of the second group may then detected, and a signal is output as a function of at least one detected signaling state of a signaling device of the second group. This may apply in in the event of a change in the signaling state such as if a traffic light turns green.

The individual steps of the method may be carried out by devices of a motor vehicle. An image can be obtained by a camera which is provided on or in the motor vehicle, the display device can have a projection device or a screen in the motor vehicle, the user input can also be effected via an appropriate mechanical interface, the evaluation and selection can take place with the aid of a suitable data processing device in the motor vehicle, and the signaling state can be detected and a signal output by units in the motor vehicle as well.

The display device may include a touchscreen, and the user input is effected by touching the touchscreen. In this way, the user input can be effected particularly intuitively. That is, the driver of a motor vehicle taps with his finger on the image of the set of traffic lights which is the important set for him. In this case, a touchscreen can be part of the motor vehicle, but can also be provided by a mobile radio device, such as a smartphone.

In another example, the display device may project an image onto a surface. In order to make an input, the driver may touch the surface and/or also execute a gesture or respectively another input by means of body language regarding the projected image including possibly only in the area in front of the surface.

Another possibility includes having the individual signaling devices successively highlighted in the representation by the display device and simply having to provide an acoustic input such as: "This set" or "STOP" via a microphone to an appropriate signal processing system in the motor vehicle. The input could then also be effected by a single manual actuation element, on running through a sequence of the represented signaling devices, when it reaches precisely the signaling device which is to be selected.

The second group may be formed from the plurality of the signaling devices by an individual signaling device, i.e. a clear definition is given by the user input. This can be predefined by a suitable system, i.e. a double selection can be made impossible.

The signal output as a function of the at least one detected signaling state of the signaling devices in the second group can be optical, acoustic or can also be detected haptically. Thus, a wailing or honking sound can be emitted, which indicates to the driver that a set of traffic lights has turned green. However, a vibration of the steering wheel or the driver's seat can also be used to output the signal.

The output signal may be a control signal for stipulating an operating state of a motor vehicle relating to driving or being stationary and, in particular, to an alteration in the operating state. For example, an alteration in the operating state, in particular an operating state of a motor vehicle relating to driving or being stationary, may include automatic stopping, switching on of the engine, starting, or accelerating. Thus, a vehicle which has come to a stop in accordance with a set of traffic lights can run through an automatic start-up process, or at least the engine can be automatically switched on again, in order to allow the driver to continue driving by pressing an accelerator. For example, in the case of a self-propelled car, an autonomous start can be initiated or take place. Conversely, it is also possible that, when driving along, the driver selects a set of traffic lights and if these turn red, automatic stopping (bringing to a stop) can be provided.

Irrespective of whether the method is carried out with the aid of devices of a motor vehicle or with the aid of a smartphone/mobile radio device, a detecting device, in particular a camera, may be used for detecting information regarding the signaling state of a signaling device, as well as an output device for outputting signals which can be detected optically, acoustically or haptically as a function of the detected information. The input device may be designed to detect an input regarding the output signals and to detect the information contained therein by means of which in the event of more than one signaling device being present, a signaling device can be selected. A data processing device may also be provided, which is designed to emit or output a second output signal on the basis of the signaling state of the selected signaling device detected by means of the detecting device.

The detecting device does not necessarily have to be a camera; rather, in the case of automatic traffic light systems, the information regarding the signaling state of the traffic lights can also be forwarded digitally, for instance via radio, to a motor vehicle. The output device may make it visible to the driver which signaling device can be selected currently. Thus, a light or colored line could, for example, be simply inserted into the windshield of the motor vehicle, in order to indicate the direction in which a signaling device to be selected is located. Various lines for various viewing directions could be run through successively. Apart from a line, any other form can of course also be displayed such as, for example, a circle. The output device may also detect in which direction a driver is currently looking ("eye-tracking") and inquire, for each viewing direction, whether the traffic lights the driver is currently looking at are relevant for the continuation of his journey. For example, an artificial voice could ask via the motor vehicle's loudspeaker: "Are you currently looking in the direction of the correct set of traffic lights?", and the driver could confirm this by providing a simple answer, supplied acoustically: "Yes", or by actuating an actuation element.

Therefore, the input device does not necessarily have to be identical to the output device, wherein the detecting device is, however, preferably a camera, and the output device is configured as a touchscreen which is part of the motor vehicle, and thus allows a direct input.

In another example, the detecting device may be a camera, and the output device transmits camera images to a portable unit (in particular a smartphone) which is distinct from the motor vehicle and which can be separated therefrom. Thus, it transmits information to the portable unit by means of its transmitting device. As a result of the transmission of information, the portable device is activated and responds by displaying the camera images.

BRIEF DESCRIPTION OF THE FIGURES

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Figure 1A:
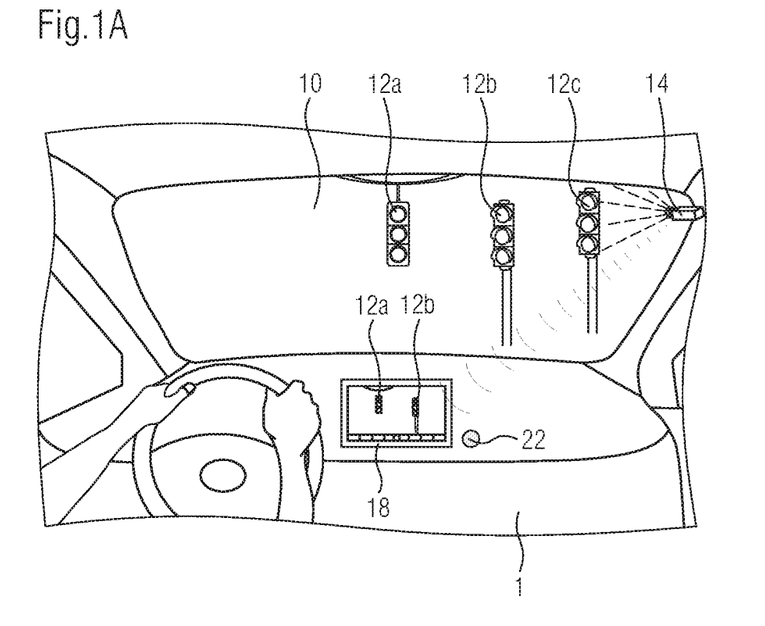
FIG. 1A is a diagram illustrating a plurality of traffic lights from the perspective of a motor vehicle operator and a representation regarding this on a touchscreen.
Figure 1B:
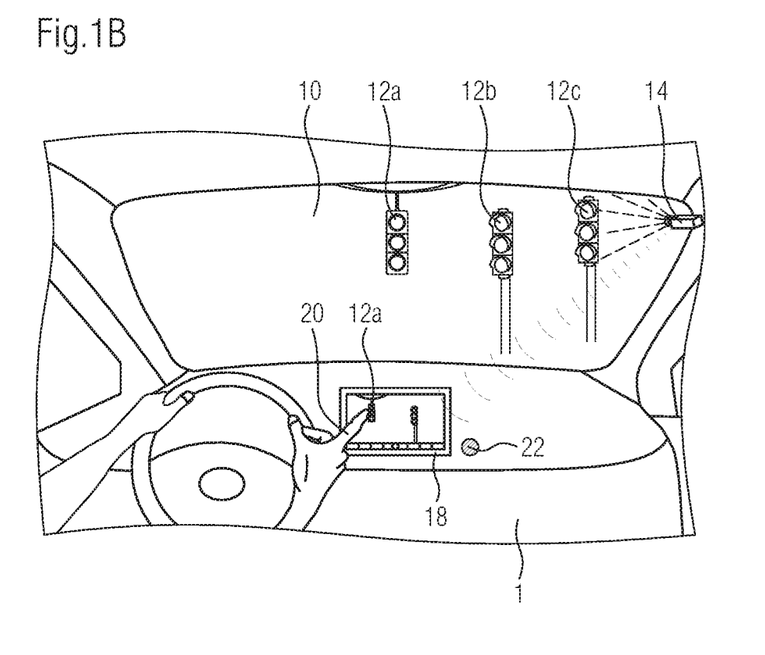
FIG. 1B is a diagram illustrating the user input of a driver related to the representation on the touchscreen according to FIG. 1A.

In a motor vehicle which is shown in FIG. 1A and referred to in its entirety as 1, a plurality of traffic lights 12*a*, 12*b*, 12*c* can be identified through a windshield 10. In or respectively on the motor vehicle 1, there is arranged a camera 14 (i.e. an optical sensor having, if applicable, a lens in front of it), with the aid of which images of all of the traffic lights 12a, 12b, 12c can be recorded. With the aid of a selection method in which, for instance as in the prior art cited above, it can be considered in which lane the car is located, or where a stop line is arranged, the cameras 12a and 12b can be selected from the cameras 12a, 12b, 12c, and the camera 12c can be rejected for being, in all probability, irrelevant for the driver. The two sets of traffic lights 12a and 12b possibly show different signaling states. Both are displayed on a touchscreen 18, so that the driver can select a set of traffic lights 12a with his hand 20 according to FIG. 1B. Subsequently, images of the selected traffic lights 12a continue to be recorded with the aid of the camera 14, and a change in the signaling state is detected. If, for example, the traffic lights change to amber and subsequently turn green, an acoustic signal is output via a microphone 22. In the case of a self-propelled car, an autonomous start can be initiated or take place.

Figure 2A:
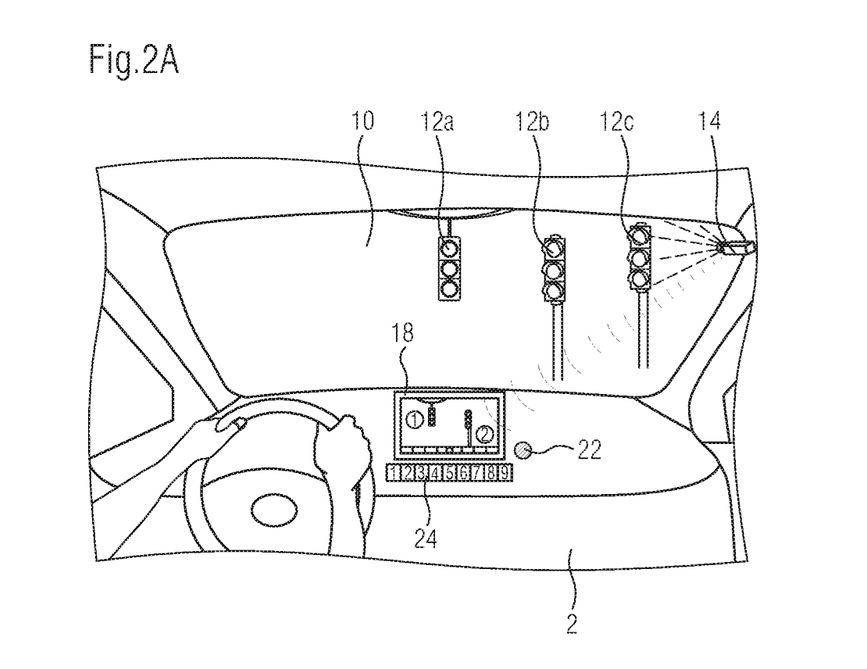
FIG. 2A is a diagram illustrating an alternative of the representation on the touchscreen according to FIG. 1A.
Figure 2B:
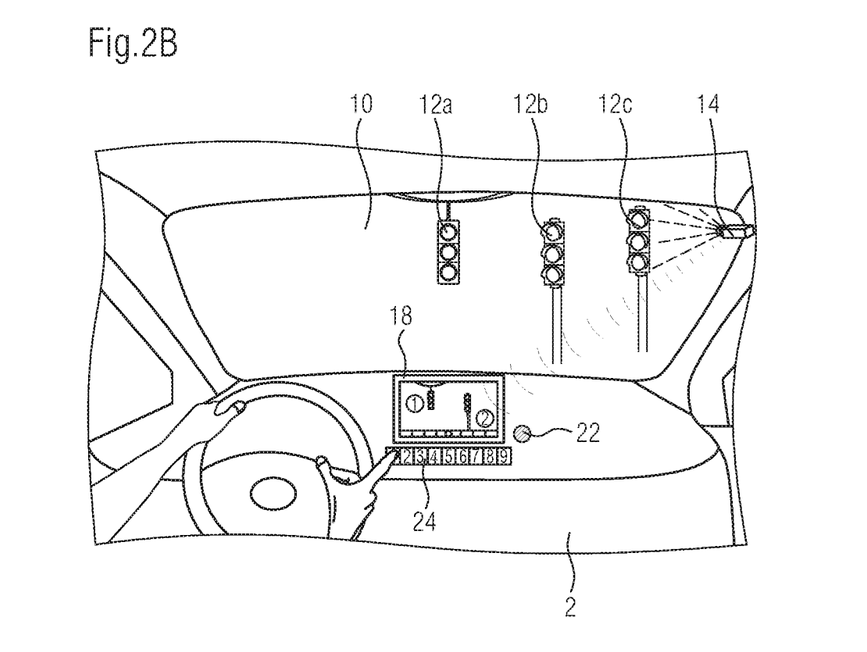
FIG. 2B is a diagram illustrating the user input related to the representation on the touchscreen according to FIG. 2A.

In the case of the alternative according to FIG. 2A, a number "1" or respectively "2" is displayed in a motor vehicle 2 in each case regarding the representation of the images of the traffic lights 12a and 12c recorded by means of the camera 14, and the driver can select, via a numerical keypad 24 (in general: an alphanumerical keyboard or other input devices for alphanumerical characters), the "1", see FIG. 2B, and a corresponding signal can subsequently be output via the microphone 22.

Figure 3:
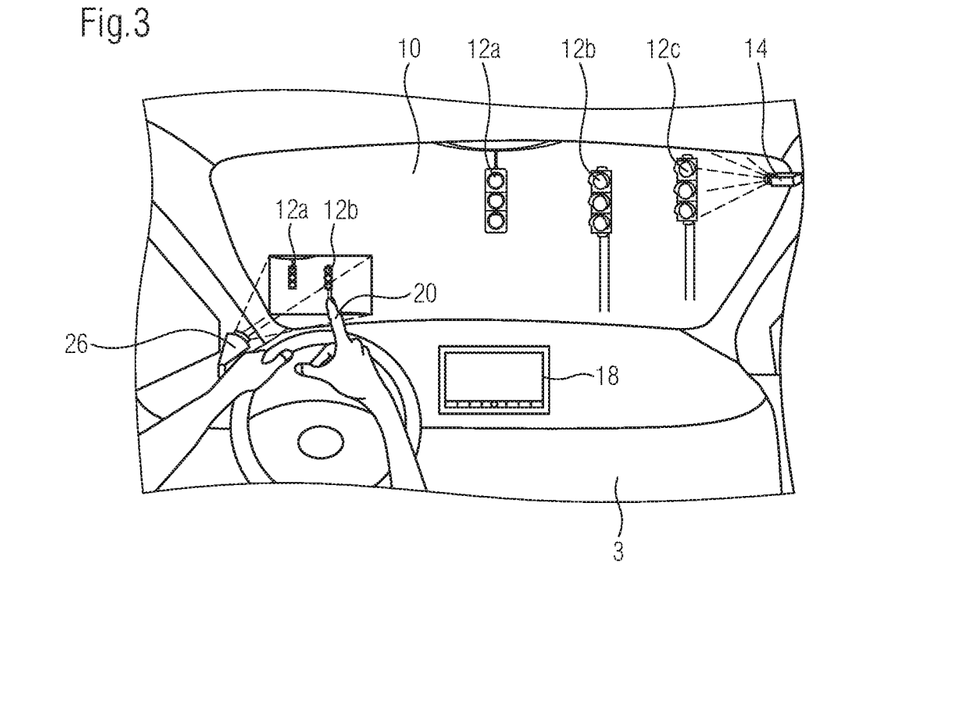
FIG. 3 is a diagram illustrating another alternative of the representation of traffic lights in a motor vehicle by a projection.

Instead of a touchscreen, as shown in FIG. 3, an image can also be cast onto the inside of the windshield 10 in a motor vehicle 3 by means of a projector 26, and the driver 20 can execute a gesture with the aid of his hand 20, for example point his finger in the direction of a set of traffic lights in the beam path, wherein the input is detected by a suitable optical sensor in the projector 26 or another detecting device such as, for instance, an additional camera (not shown).

Figure 4:
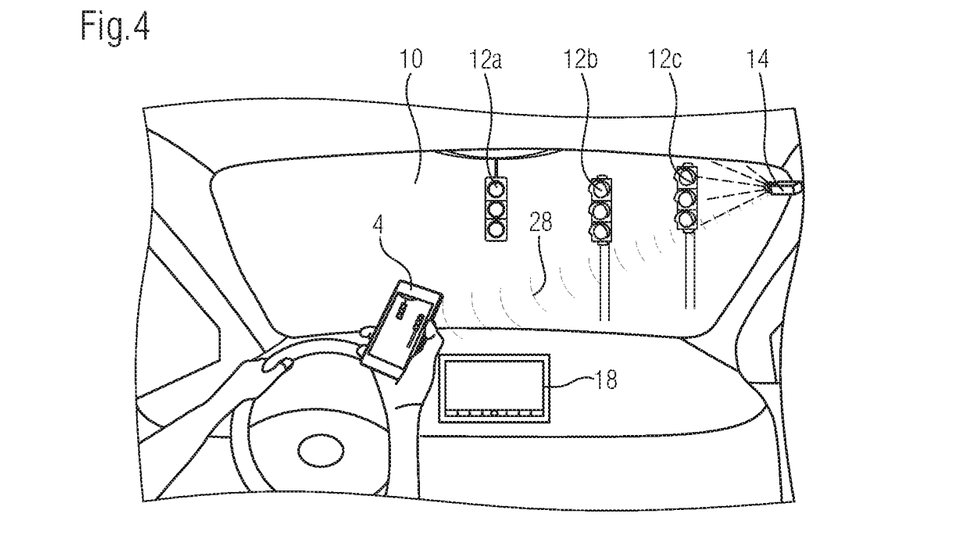
FIG. 4 is a diagram illustrating an alternative to the representation of traffic lights in a motor vehicle, using a smartphone.

In another example, it is also possible for the image to be represented on a smartphone which is shown in FIG. 4 and designated therein by 4. The camera 14 transmits, for example, by radio (as indicated by the radio connection 28), the images of the traffic lights 12a and 12b to the smartphone 4. The user can then make an appropriate selection on the smartphone 4, because the surface of the smartphone acts like the touchscreen from FIG. 1A.

Figure 5:
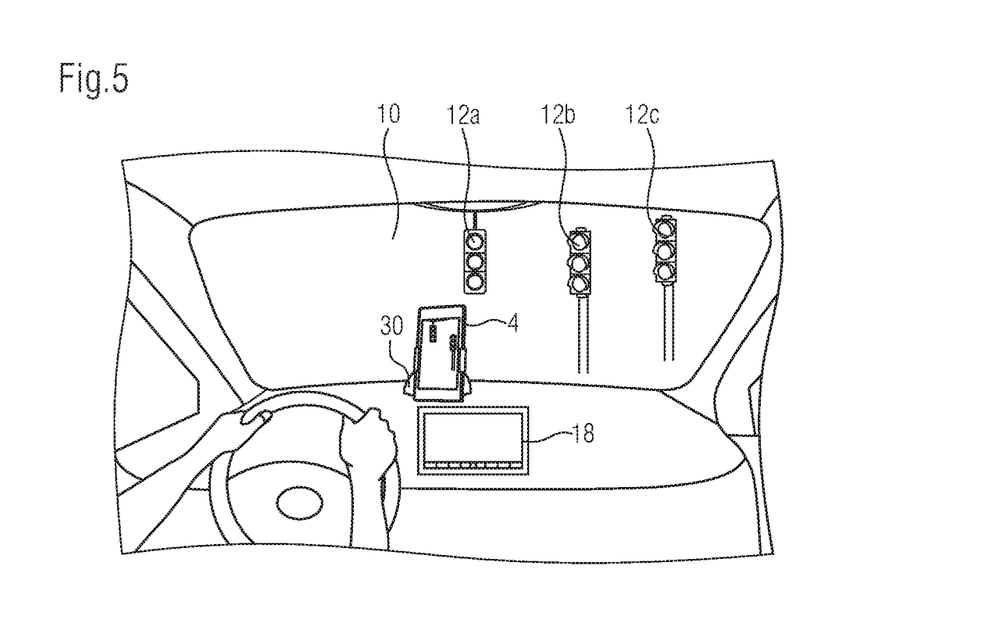
FIG. 5 is a diagram illustrating a variant of the alternative according to FIG. 4.

According to FIG. 5, the smartphone 4 can be secured in a bracket 30, wherein the camera of the smartphone 4 itself can be used, in order to record images of the traffic lights 12a, 12b and 12c and to select the traffic lights 12a and 12b according to an algorithm.

Figure 6:
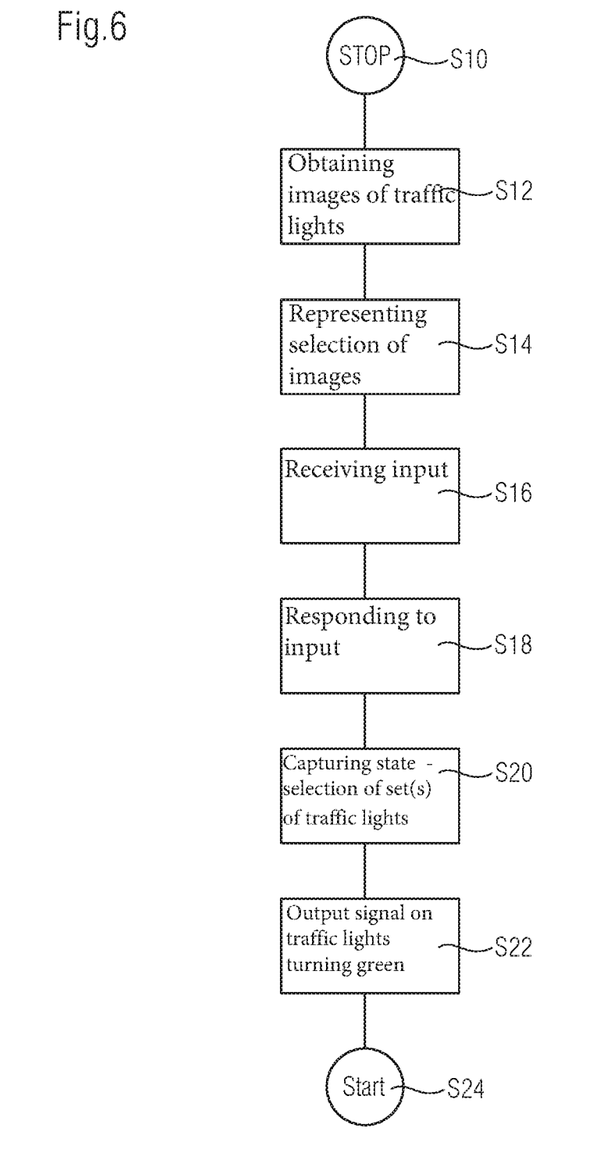
FIG. 6 is a diagram illustrating a flow diagram in order to illustrate the steps of the method according to the invention.

The method explained again below in full is described in reference to FIG. 6.

In an example, the method commences with the stopping of a motor vehicle ("STOP") as step S10, after which the images of the traffic lights 12a, 12b, 12c are obtained in step S12 with the aid of the respective camera 14 (FIGS. 1A, 1B, 3 and 4) or with the aid of the camera of the smartphone 4 (in FIG. 5). In step S14, the selection of the images is then shown (on the touchscreen 18 according to FIG. 1A and FIG. 2A, on the windshield 10 according to FIG. 3, on the smartphone 4 according to FIG. 4 or FIG. 5). In step S16 the input is then received (see FIG. 1B on the touchscreen 18, FIG. 2B on the keyboard 24, FIG. 3 by means of the finger 20 in the beam path, FIG. 4 on the smartphone 4 and, in the case of FIG. 5, on the smartphone 4). The input is evaluated according to step S18: Since only a single set of traffic lights 12a has been selected in all of the examples provided here, it is detected in step S18 that the set of traffic lights 12a is to be subsequently observed. The signaling state of this selected set of traffic lights 12a is detected in step S20 and, in step S22, when the traffic lights turn green, an output signal is given, for example via the loudspeaker 22. The motor vehicle is then started by the driver himself or by an autonomous driving system after the stop in step S24.

The features of the invention disclosed in the preceding description, in the following claims as well as in the drawings can be essential, both individually and in any combination, for realizing the invention in its various embodiments.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE NUMERALS 1, 2, 3 Motor vehicle
4 Display device, smartphone
10 Surface, windshield
12a, 12b, 12c Signaling devices, traffic lights
14 Camera
18 Touchscreen
20 Hand
22 Loudspeaker
24 Input device, keyboard
26 Output device, projector
28 Radio connection
30 Bracket

What is claimed is:

1. A method for identifying a signaling state of at least one signaling device comprising a traffic light from a plurality of signaling devices, the method comprising:
   obtaining at least one image which comprises each of the plurality of signaling devices;
   identifying all of the plurality of signaling devices as traffic light signals;
   eliminating one or more of the identified traffic light signals in response to determining that the one or more identified traffic light signals are irrelevant to a driver, to provide a first group of the plurality of signaling devices including all of the plurality of signaling devices other than the identified and eliminated traffic light signals;
   projecting an image of the first group of the plurality of signaling devices onto a surface comprising a windshield of a motor vehicle using a display device;
   receiving a user input regarding the display device or regarding the representation of the first group of the plurality of signaling devices provided by the display device, the user input comprising at least one of touching the surface, executing a gesture, and providing an input using body language related to the projected image;
   eliminating a subset of the first group of the plurality of signaling devices based on the user input;
   evaluating the user input and selecting a second group from the first group of the plurality of signaling devices corresponding to all signaling devices other than the eliminated subset of the first group of the plurality of signaling devices; and detecting the signaling state of the at least one signaling device of the second group and outputting a signal as a function of the detected signaling state of the at least one signaling device of the second group in response to a change in the signaling state, wherein the output signal is a control signal for at least one of stipulating and altering an operating state of the motor vehicle.

2. The method of claim 1, wherein the display device comprises a touchscreen and the user input is effected by touching the touchscreen, wherein the touchscreen is part of the motor vehicle or of a mobile radio device.

3. The method of claim 1, wherein the image is obtained using at least one camera, which is provided as part of the motor vehicle or a mobile radio device.

4. The method of claim 1, wherein the image is transmitted wirelessly via radio to the display device.

5. The method of claim 1, wherein the second group comprises a single signaling device.

6. The method of claim 1, further comprising activating an output device emitting optical signals, acoustic signals, or signals which are detected haptically using the output signal, wherein the output device is provided as part of the motor vehicle or of a mobile radio device.

7. A device in the motor vehicle or a mobile radio device configured for use with the method of claim 1, the device comprising:

a detecting device comprising at least one camera for detecting information regarding the signaling state of the at least one signaling device, the at least one camera comprising a data processing unit; and an output device for outputting signals which are configured to be detected optically, acoustically, or haptically as a function of the detected information, wherein at least one of the output device and an input device is configured to detect an input regarding the output signals or information contained therein, and in response to more than one signaling device being present, a signaling device is selected so that a signaling state of the selected signaling device is identified using the detecting device.

8. The device of claim 7, wherein the output device comprises a touchscreen which is part of the motor vehicle or the mobile radio device.

9. The device of claim 7, wherein the output device is designed to activate a portable device comprising the mobile radio device which is distinct from the motor vehicle by transmitting information to the output device using a transmitting device.

* * * * *